C. L. HEISLER.
PACKING.
APPLICATION FILED FEB. 24, 1920.

1,386,865.

Patented Aug. 9, 1921.

Inventor,
Charles L. Heisler,
by Albert G. Davis
His Attorney.

UNITED STATES PATENT OFFICE.

CHARLES L. HEISLER, OF SCHENECTADY, NEW YORK, ASSIGNOR TO GENERAL ELECTRIC COMPANY, A CORPORATION OF NEW YORK.

PACKING.

1,386,865. Specification of Letters Patent. Patented Aug. 9, 1921.

Application filed February 24, 1920. Serial No. 360,938.

*To all whom it may concern:*

Be it known that I, CHARLES L. HEISLER, a citizen of the United States, residing at Schenectady, in the county of Schenectady, State of New York, have invented certain new and useful Improvements in Packings, of which the following is a specification.

The present invention relates to packings of the labyrinth type comprising a plurality of axially extending, interleaving rings, some of which carry radially extending annular projections which pack against the surfaces of adjacent rings, thereby forming a tortuous passage to baffle the flow of fluid, the leakage of which it is desired to prevent.

The object of my invention is to provide an improved packing of the above referred to type, and an improved packing element for use therein, and for a consideration of what I believe to be novel in my invention attention is directed to the accompanying description and the claims appended thereto.

Figure 1:
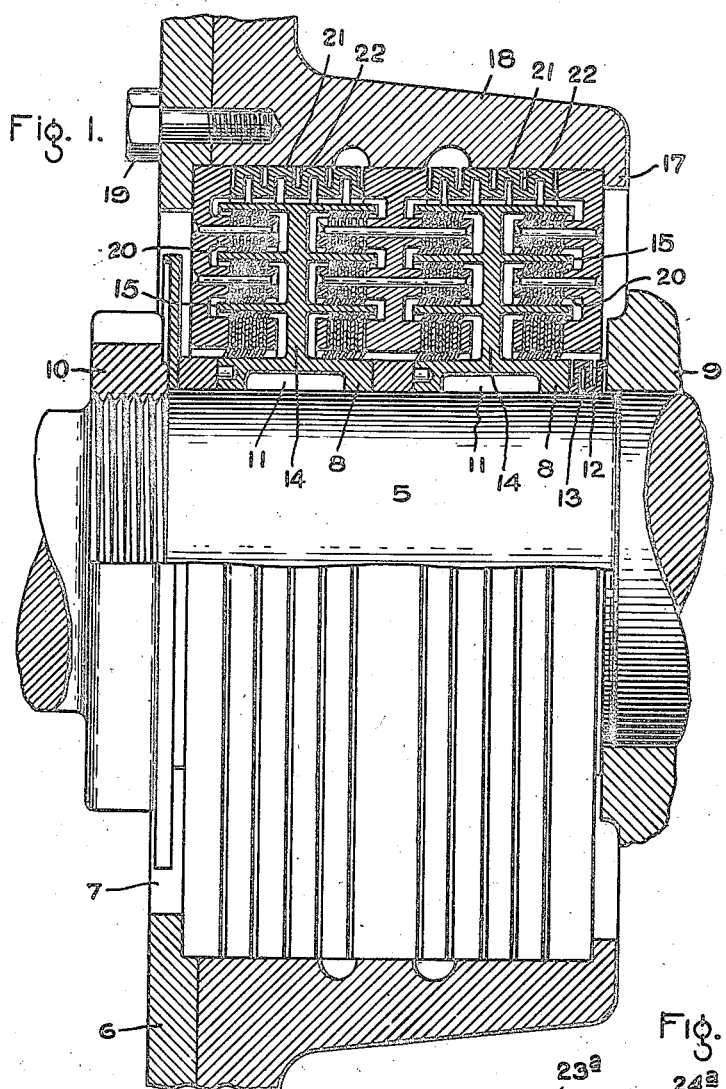
Figure 2:
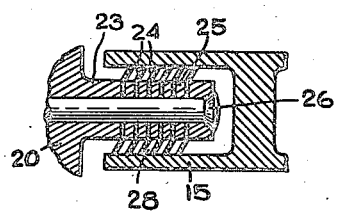
Figure 3:
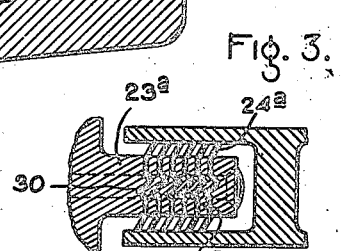

In the drawing, Figure 1 is a side elevation partly in section of a packing embodying my invention; Fig. 2 is an enlarged sectional detail of part of a packing element; and Fig. 3 is a modification.

Referring to the drawing, 5 indicates a rotating shaft which may be, for example, the shaft of an elastic fluid turbine, and 6 indicates a wall having an opening 7 through which the shaft projects and between which and the shaft it is desired to prevent leakage. Wall 6 may be, for example, a part of a turbine casing. Carried by shaft 5 are one or more sleeves 8 held between a collar 9 on the one hand, and a ring 10 which threads on to shaft 5 on the other hand. Sleeves 8 are preferably provided with internal grooves 11 so they engage the shaft at spaced points and between them and the collar 9 is a ring 12 having slots 13 cut therein so as to permit the sleeves to expand and contract axially. Carried by the central portions of sleeves 8 are annular collars 14 projecting from the side faces of which are concentric, radially spaced, axially extending rings 15. As will be clear a packing element as just described may be formed by taking a suitable block of material and cutting grooves in its two side faces to form the rings 15 and collar 14, and these operations can be performed with a single setting of the piece of material so that the rings 15 are accurately concentric. The collars 14 with the annular rings 15 thereon form the rotating element of the packing.

The stationary element of the packing is carried between casing wall 6 and a flange 17 at the outer edge of a housing 18, which housing is fastened to wall 6 by bolts 19. It comprises a plurality of disks 20 spaced by means of rings 21 in which are cut slots 22 to make them axially yieldable to take care of expansion. Projecting from either one or both surfaces of disks 20 are concentric, annular projections 23. The two end disks 20 of the stationary part of the packing have projections 23 on only one side thereof while the intermediate disks 20 have them on both sides thereof. Carried by projections 23 are a plurality of thin, concentric rings 24 spaced by means of collars 25 and fastened in place by a suitable number of rivets or bolts 26. Rings 24 are made of thin material and extend beyond the sides of projections 23 and collars 25 to provide annular sharp edged strips which pack against the adjacent surfaces of concentric rings 15. Rings 24 may be arranged to provide strips projecting from either one or both sides of projections 23 as found desirable.

As will be clear, the desired number of packing rings 24 can be readily applied to projections 23 by taking a suitable number of them of the desired diameters and building them up on projections 23 with spacing collars 25 between them and after they are in place inserting the rivets or bolts 26. With this arrangement the packing rings 24 may without difficulty be constructed of as thin material as it is found desirable to use, and they will be very firmly and accurately attached to projections 23. This forms a packing element which can be readily manufactured at a low cost and in which the packing rings may be made of any suitable material, such as thin sheet nickel, for example. Also by this arrangement, I provide a plurality of thin edged strips packing against each surface of rings 15 and between each pair of strips is an annular chamber 28 which forms an expansion chamber and assists in baffling the flow of leakage fluid through the packing.

In Fig. 3, I have shown a modified arrangement wherein the rings 24ª, corresponding to rings 24 of Fig. 1, and the collars 25ª are provided with inter-engaging tongues and grooves, as indicated at 30. This arrangement serves to very firmly anchor the packing rings to the annular projections 23ª and collars 24ª to prevent possible axial shifting of such rings.

As is obvious, a packing of any desired length may be built up by multiplying the number of packing elements used.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. A packing element comprising a disk having concentric annular projections on a side thereof, and a plurality of packing rings of thin material fastened to the edges of said projections, said packing rings being spaced by means of collars arranged between them.

2. A packing element comprising a disk having annular projections on a side thereof, a plurality of flat, annular rings concentric with said projections with their edges extending beyond the sides of said projections, and spacing collars between said rings.

3. A packing element comprising a disk having annular projections on a side thereof, a plurality of flat annular rings concentric with said projections with their edges extending beyond the sides of said projections, spacing collars between said rings, and rivets extending through said rings and collars for fastening them to said projections.

4. A packing element comprising a disk having radially spaced annular projections on both sides thereof, flat disk-like rings of thin material which are placed against the edges of said projections, collars spacing said rings apart, and bolts which pass through them to fasten the rings and collars to said projections.

5. The combination with adjacent, relatively rotating elements of a packing comprising a plurality of concentric members carried by each of said elements, some of said members comprising a plurality of thin edged rings, spacing rings between them, and means fastening said rings together.

6. The combination with a wall having an opening, and a rotating shaft extending therethrough, of a packing comprising a plurality of axially extending concentric interleaving rings carried by said shaft and wall, some of said rings being made up of a plurality of annular spacing members between which are annular strips of thin metal which project beyond said spacing members.

7. The combination with a wall having an opening, and a rotating shaft extending therethrough, of a packing comprising a plurality of radially extending disks carried by the shaft and casing, and axially extending interleaving rings carried by said disks, some of said rings comprising thin edged annular strips of metal and annular spacing members between them, said strips projecting beyond the spacing members and packing against the surfaces of adjacent rings.

In witness whereof, I have hereunto set my hand this 20th day of February, 1920.

CHARLES L. HEISLER.